July 3, 1956 — A. SYLVAIN — 2,752,967
SEED POTATO SEPARATOR AND CUTTER
Filed March 8, 1952 — 4 Sheets-Sheet 1

INVENTOR
AUREL SYLVAIN
Howard J. Whelan
ATTORNEY

July 3, 1956  A. SYLVAIN  2,752,967
SEED POTATO SEPARATOR AND CUTTER
Filed March 8, 1952  4 Sheets-Sheet 3

INVENTOR
AUREL SYLVAIN

BY Howard J. Whelan

ATTORNEY

July 3, 1956

A. SYLVAIN 2,752,967

SEED POTATO SEPARATOR AND CUTTER

Filed March 8, 1952

4 Sheets-Sheet 4

INVENTOR
AUREL SYLVAIN.

BY Howard J. Whelan

ATTORNEY

United States Patent Office 2,752,967
Patented July 3, 1956

2,752,967
SEED POTATO SEPARATOR AND CUTTER
Aurel Sylvain, Hartford, Conn.
Application March 8, 1952, Serial No. 275,589
4 Claims. (Cl. 146—59)

This invention relates to a seed potato cutter and it is one object of the invention to provide a machine of this character that bulk quantities of seed potatoes may be dumped into a hopper at one end of the machine from which they are removed by an endless conveyor screen through which sand, stones and potatoes too small for planting pass, the remaining potatoes being delivered to other conveyor screens which separate them according to size and carry potatoes of cuttable size to cutters which slice them into a number of parts or sections which are to be planted.

Another object of the invention is to provide a potato cutting machine having conveyor screens so arranged that large potatoes will be retained upon an upper screen which carries them to cutters, medium sized potatoes being caught upon a second conveyor screen under the upper screen and delivered to a conveyor which carries them to cutting knives, and small potatoes of usable size being caught by a third conveyor which delivers them to a final conveyor by means of which all of the seed potatoes to be planted are delivered to a suitable container, such as a barrel or the like.

Another object of the invention is to provide a potato cutting machine having an improved arrangement of cutters and members for directing movement of the potatoes into slicing engagement with the cutters.

Another object of the invention is to provide a potato cutter wherein the largest potatoes may be manually sorted and potatoes not large enough to be cut into four pieces delivered to cutters which cut them into three pieces while the others are delivered to cutters which cut them into four pieces.

Another object of the invention is to provide a potato cutter wherein all movable elements are driven from a single motor, one shaft being rotated at such speed that strips carried thereby will engage potatoes and push them towards cutters and thus insure proper cutting of the potatoes.

Another object of the invention is to provide a potato cutter which is very compact and easy to operate, and not liable to get out of order or become broken.

Figure 1:
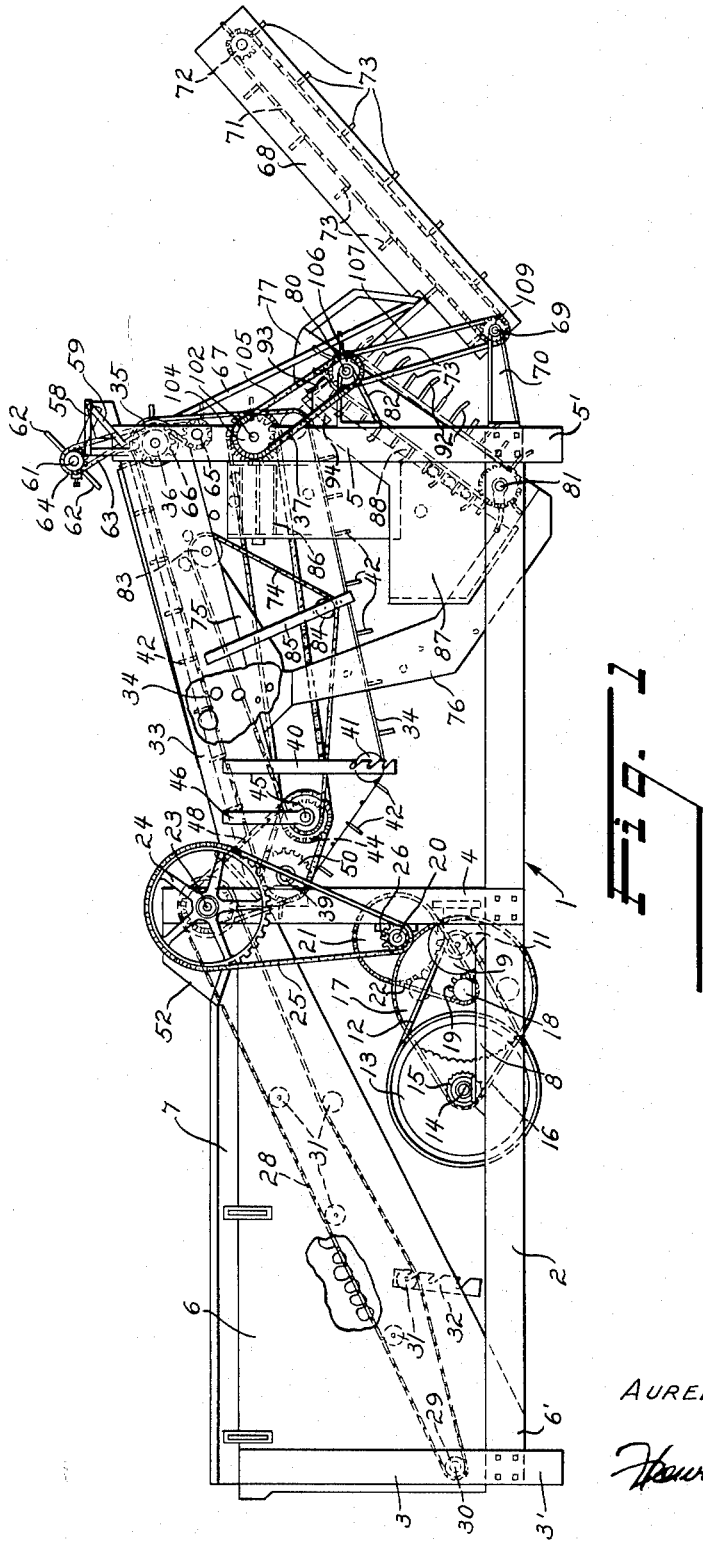
Figure 2:
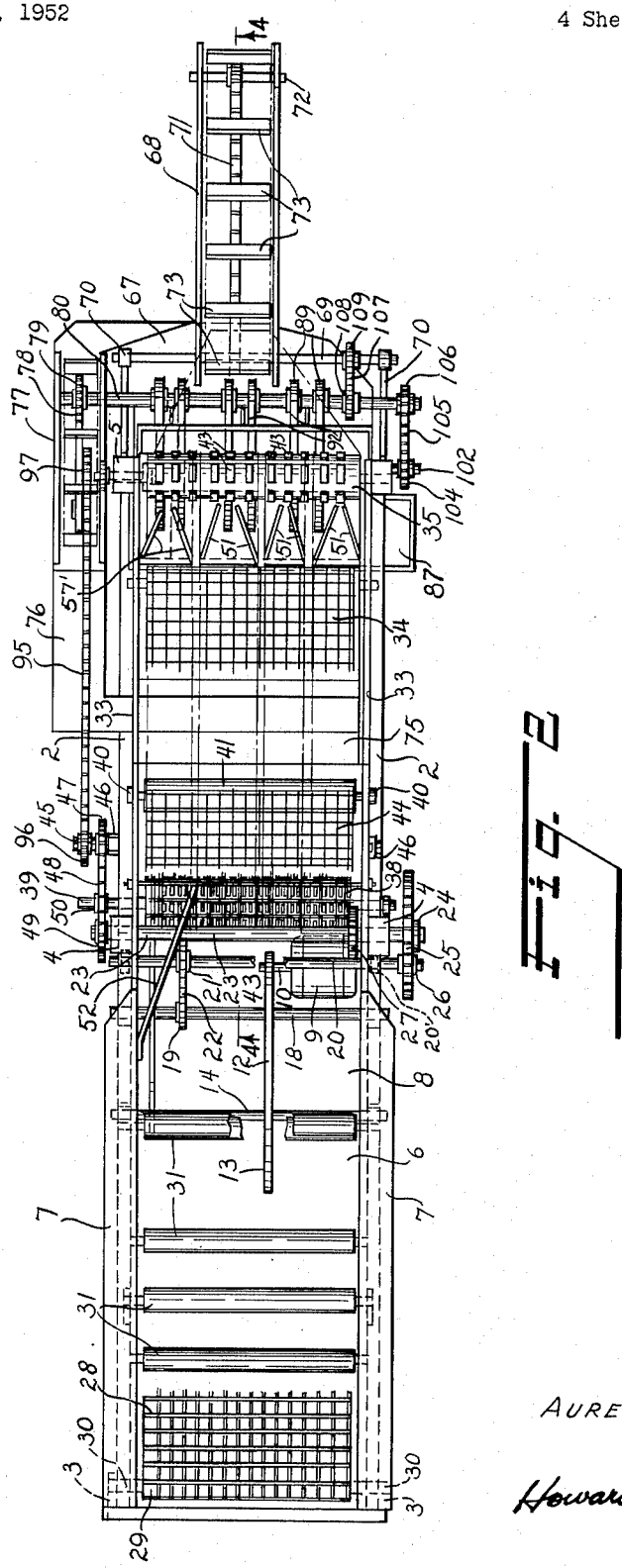
Figure 3:
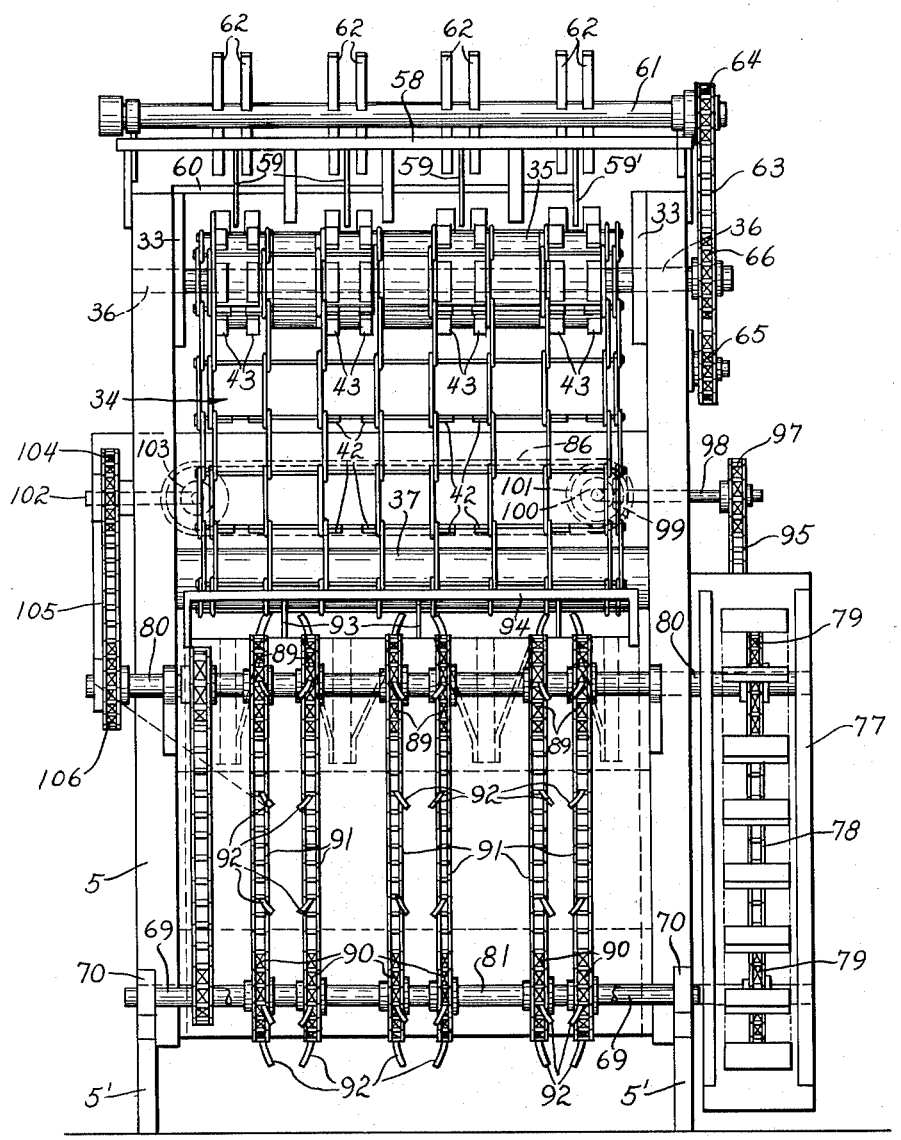
Figure 4:
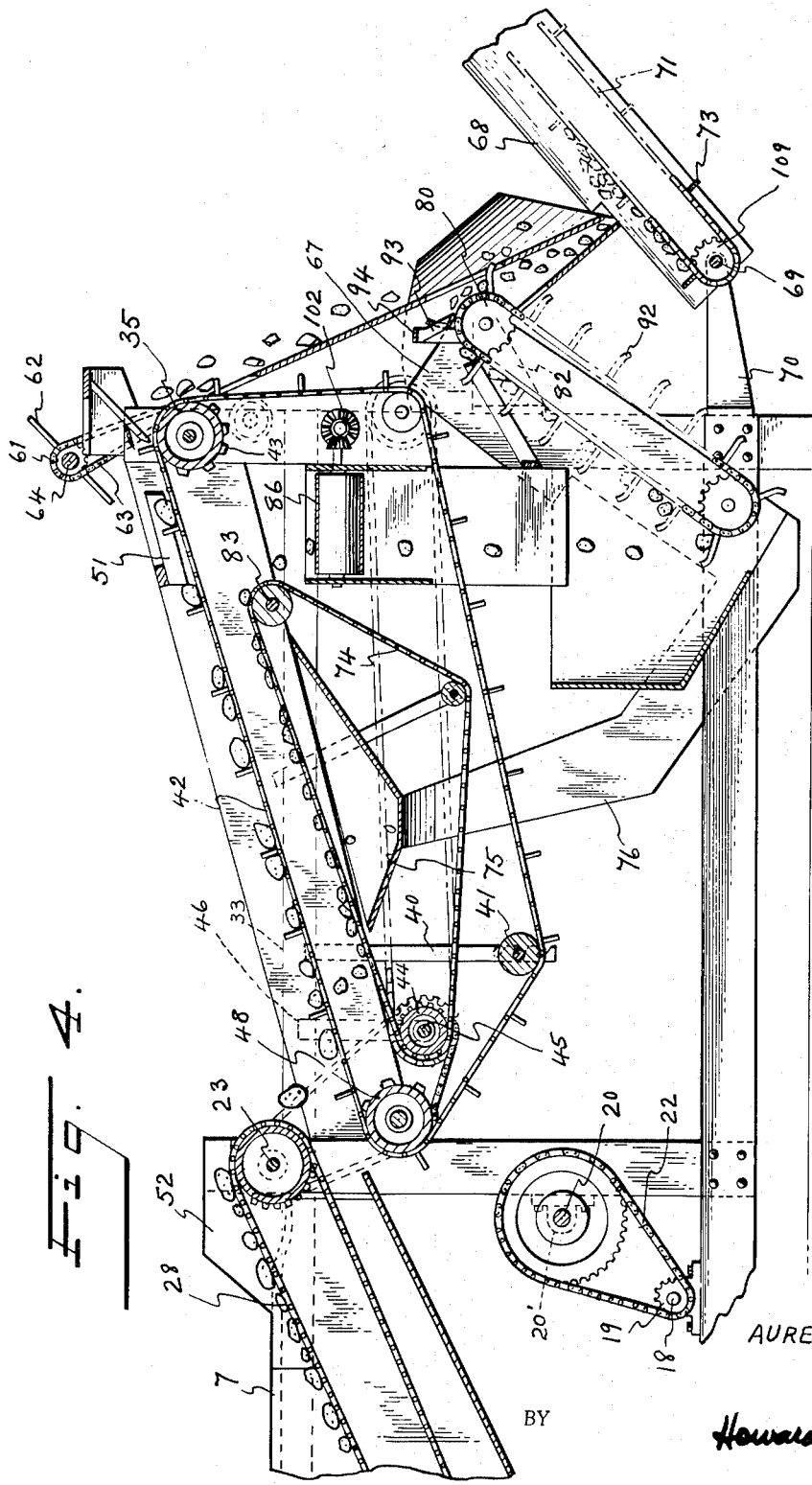

The invention is illustrated in the accompanying drawings wherein:

Fig. 1 is a side view of the improved potato cutter.
Fig. 2 is a top plan view thereof.
Fig. 3 is a view upon an enlarged scale looking at the front end of the potato cutter.
Fig. 4 is a vertical enlarged sectional view taken on line 4—4 of Fig. 2 longitudinally through the potato cutter.

This improved potato cutter has a frame 1 including in its construction side bars 2 to which lower portions of vertical bars 3, 4, and 5 are secured, the end bars 3 and 5 having portions 3' and 5' constituting feet for the frame. Between the bars 3 and 5 is a hopper 6 which extends the full width of the frame and is open at its top so that potatoes in bulk quantity may be dumped into the hopper, there being side boards 7 for directing potatoes into the hopper. The bottom of the hopper extends at a downward incline towards the rear end thereof and leads to an outlet 6' through which sand, stones, and potatoes too small for planting leave the hopper and may be carted away.

A platform 8 is supported horizontally upon the side bars 2 rearwardly of the bars or standards 4 and upon this platform is mounted an electric motor 9, the shaft 10 of the motor carrying a pulley wheel 11 engaged by a belt 12 which is trained about a large pulley 13 carried by a shaft 14 rotatably supported across the rear end of the platform. A small sprocket wheel 15 is mounted upon shaft 14 and a sprocket chain 16 connects this sprocket with a large sprocket wheel 17 carried by a shaft 18 rotatably mounted across the platform (see Figs. 1 and 4). This shaft 18 carries a small sprocket wheel 19 and about a shaft 20 rotatably mounted upon bearing blocks 20' carried by the standards 4, the shaft extending transversely of the frame, there is mounted a large sprocket wheel 21 connected with the sprocket 19 by a sprocket chain 22 so that rotary motion is transmitted from shaft 18 to the shaft 20. A shaft 23 extends between upper ends of the standards 4 with its end portions rotatably mounted through the same and one end portion of this shaft carries a large sprocket wheel 24 about which is trained a sprocket chain 25 having its lower portion engaged about a small sprocket wheel 26 carried by the shaft 20. It will thus be seen that the shaft 23 is rotated at a speed greatly reduced relative to the speed of the motor shaft.

Sprocket wheels 27 are carried by the shaft 23 and about these sprocket wheels is engaged the upper forward end of an endless conveyor screen 28 which extends longitudinally in the hopper 6 and has its lower end trained about an idler roller 29 having its shaft 30 rotatably mounted through lower portions of the bars or standards 3. The screen conveyor 28 extends at an upward incline towards its front end and its upper and lower flights are supported upon rollers 31, one of the rollers upon which the lower flight rests being loosely mounted in brackets 32 and thereby mounted for vertical adjustment and serving as a tightener for the screen. The screen is formed with openings or meshes of such size that while it will support potatoes of usable size, sand, stones, and very small potatoes may pass through the openings and drop upon the sloping bottom of the hopper down which they roll to the outlet at the lower end of the bottom and drop upon the floor in a pile from which they are carted away to a suitable place of disposal.

Bars or strips 33 are mounted between the standards 4 and 5 and between these bars moves the upper flight of an upper screen conveyor 34 formed with openings of such size that small potatoes and medium size potatoes of less than 2½ inch size may pass through the openings, large potatoes being held upon the conveyor and moved forwardly thereby towards a roller 35 rotatably mounted between the upper ends of the standards 5 by its roller 36 and downwardly from which the front portion of the conveyor extends. Spaced downwardly from the roller 35 is an idler roller 37 about which the screen conveyor 34 engages and then extends rearwardly to form the lower flight of the conveyor. The rear end of this conveyor is engaged about a drive roller 38 having its shaft 39 rotatably mounted in front of the standards 4. Strips or brackets 40 extend downwardly from the side strips 33 and between them is loosely mounted a roller 41 which rests upon the lower flight of the conveyor 34 and serves as a tightener for the conveyor. Plates 42 which project from the screen conveyor 34 assist in moving large potatoes forwardly with the upper flight of the conveyor and as the rollers 35 and 38 carry teeth 43 which engage the cross rods of the conveyor rotary motion will be very effectively imparted to the conveyor from roller 38 and the conveyor will impart rotation to the roller 35. A roller 44 has its shaft 45 rotatably supported by hangers or brackets 46 extending downwardly from the side strips 33 and one end portion of this shaft carries a sprocket wheel 47 about which is engaged a sprocket chain 48 having its upper portion trained about a sprocket wheel 49 carried by the shaft 23 and its rear flight engaged with the sprocket wheel 50 carried by the shaft 39 so that the roller 38 is rotated and imparts movement to the screen conveyor 34. Large potatoes which are carried forwardly upon the screen conveyor 34 are delivered to cutting mechanism mounted between upper ends of the standards 5 and as they approach the cutting mechanism they pass between resilient guide strips 51 arranged in pairs which converge forwardly. Attention is called to the fact that over the conveyor 28 is mounted a deflector plate 52 which serves to cause potatoes carried forwardly by this conveyor to be directed away from the left hand side of this conveyor and drop upon the conveyor 34 without spreading over throughout the entire width of the conveyor 34.

The large potatoes which are retained by the screen conveyor 34 are generally of a size permitting them to be cut into four pieces but certain of them are only of a size permitting them to be cut into three pieces. These potatoes are hand picked from the conveyor and manually transferred to its left hand portion and pass between the guide strips 57'. A frame 58 is supported above and between the upper ends of the standards 5 and this frame carries downwardly extending blades 59 and 59' which cooperate with a horizontally extending blade 60. A shaft 61 which is rotatably mounted horizontally over and between upper ends of the standards 5 carries radially extending arms 62 constituting pushers and rotation of the shaft is so timed in relation to movement of the conveyor 34 that as potatoes are moved between the resilient guide strips by the pushers 42 ends of the arms 62 will engage the potatoes and force them against the blades. The potatoes which engage the blades 59 and the blade 60 will be cut into four pieces but those which pass between the guides 57' and engage the blade 59' will be cut into three pieces as the blade 60 does not project from the outer side face of this blade.

A sprocket chain 63 transmits rotation to the shaft 61, and referring to Figure 3 it will be seen that this chain has its upper end engaged about a sprocket wheel 64 carried by the shaft 61 and its lower end engaged about an idler sprocket wheel 65 so positioned that it holds the rear flight of the chain in driving engagement with a sprocket wheel 66 carried by the shaft 36 of roller 35. The cut potatoes drop into a trough or chute 67 mounted upon and extending forwardly from the front of the machine at a downward incline with its lower end terminating near the lower end of a trough conveyor 68. The lower end of the conveyor 68 is mounted upon a shaft 69 rotatably supported between bearing brackets 70 which project forwardly from the standards 5 and in the trough of conveyor 68 is an endless sprocket chain 71 trained about upper and lower sprocket wheels 72 and carrying transversely extending blades 73 which carry the cut potatoes upwardly through the trough conveyor and out of the upper end thereof so that they fall into a barrel or other suitable receptacle.

The medium sized potatoes and the small potatoes of usable size which drop through the conveyor 34 land upon a lower screen conveyor 74 and the small potatoes pass through this conveyor and drop into flared mouth or hopper 75 at the upper end of a duct or chute 76 extending to the lower end of a trough conveyor 77. An endless conveyor chain 78 extends longitudinally in the trough of conveyor 77 and has its end portions trained about sprocket wheels 79 carried by shafts 80 and 81, the shaft 80 being rotatably supported by bearing brackets 82 projecting forwardly from the standards 5. The potatoes moved upwardly through the conveyor trough pass outwardly from the upper end thereof and are delivered onto the chute 67 so that they may be taken up by the conveyor 68 along with the potatoes which are cut into three and four pieces, according to their position on the conveyor, and fed into the barrel into which the cut potatoes to be used for planting are delivered from conveyor 68.

The medium sized potatoes which are retained upon the screen conveyor 74 are discharged therefrom at the point where this conveyor passes about the roller 83, the rear portion of the screen conveyor being engaged about the roller 44 which drives the conveyor and the lower flight of the conveyor being engaged by a tensioning roller 84 loosely supported between hangers 85. As the medium sized potatoes drop from the lower screen conveyor they drop upon a belt conveyor 86 from which they pass into a hopper 87 at the front of which is a trough 88 extending upwardly at a forward incline. The shafts 80 and 81 pass through upper and lower portions of the trough 88 and carry sprocket wheels 89 and 90 about which are trained endless sprocket chains 91 carrying arms 92 by means of which potatoes are moved upwardly and pressed into cutting engagement with blades 93 carried by a frame 94 mounted across the upper portion of the trough. These blades cut the medium sized potatoes into two pieces which drop onto the chute 67 and are carried upwardly therefrom through the conveyor 68 along with the rest of the potatoes to be planted.

A sprocket chain 95 which is trained about sprocket wheels 96 and 97 transmits rotary motion from the shaft 45 to a shaft 98 journaled through the standard 5 at one side of the machine and this shaft carries a beveled gear 99 meshing with a companion beveled gear 100 carried by the roller 101 about which one end portion of the belt conveyor 86 passes. A shaft 102 which is journaled through the standard 5 at the other side of the machine is similarly geared to the roller 103 of the belt conveyor and carries a sprocket wheel 104 and about this sprocket wheel is engaged the upper portion of a sprocket chain 105 having its lower end portion engaged about a sprocket wheel 106 carried by the shaft 80. A sprocket chain 107 has its upper end portion trained about a sprocket wheel 108 carried by shaft 80 and its lower end portion engaged about a sprocket wheel 109 carried by the shaft 69 and causes operation of the conveyor 71.

This improved potato cutting machine is very compact in its construction and efficient in operation and when it is in use bulk potatoes dumped into the hopper will have sand, small stones, and very small potatoes removed therefrom, the usable potatoes being delivered from the hopper onto the upper screen conveyor through which medium sized potatoes pass while the large potatoes are moved towards the cutters which cut large potatoes into four pieces and cut potatoes of somewhat small size into three pieces. The medium sized potatoes which remain upon the lower screen conveyor are cut into two pieces and the small potatoes pass through the machine without being cut. The cut potatoes and the small potatoes of usable size are all delivered to the conveyor 68 by means of which they are delivered to a barrel or other receptacle.

Having thus described the invention, what is claimed is:

1. A machine for cutting and sizing seed potatoes comprising a main frame; an inclined hopper in said frame adjacent one end thereof, an endless screen conveyor extending longitudinally at an incline over said hopper for separating culls and trash from usable potatoes as the potatoes are moved upwardly thereon over said hopper, said conveyor having its upper end terminating beyond said hopper, an upper inclined screen conveyor in said hopper having its lower end positioned beneath the upper end of said first conveyor; said upper conveyor being of relatively wide mesh, transverse plates on said upper conveyor, a chute extending downwardly from the upper end of said inclined upper conveyor, a lower inclined conveyor beneath said upper conveyor for the reception of potatoes dropping through the mesh of said upper conveyor; a chute extending downwardly from the upper end of said lower conveyor to a point adjacent the lower end of said first mentioned chute, said lower conveyor having a smaller mesh than said upper conveyor, standards extending upwardly from the end of the frame adjacent the upper end of said upper conveyor, vertical and horizontal cutter blades extending between said standards; a chute extending from said upper end of said lower conveyor to a point adjacent the lower end of said first mentioned chute, second cutting blades adjacent the end of said last mentioned chute, a trough conveyor adjacent and below the juncture of said chutes for raising said potatoes from all the chutes to a position suitable for bagging, drive means for all said conveyors and a common source of power for all said drive means.

2. A machine for cutting and sizing seed potatoes comprising a main frame, an inclined hopper in said frame adjacent one end thereof, an endless screen conveyor extending longitudinally at an incline over said hopper for separating culls and trash from usable potatoes as the potatoes are moved upwardly thereon over said hopper, said conveyor having its upper end terminating beyond said hopper, an upper inclined screen conveyor in said hopper having its lower end positioned beneath the upper end of said first conveyor; said upper conveyor being of relatively wide mesh, transverse plates on said upper conveyor, a chute extending downwardly from the upper end of said inclined upper conveyor, a lower inclined conveyor beneath said upper conveyor for the reception of potatoes dropping through the mesh of said upper conveyor; a chute extending downwardly from the upper end of said lower conveyor to a point adjacent the lower end of said first mentioned chute, said lower conveyor having a smaller mesh than said upper conveyor, standards extending upwardly from the end of the frame adjacent the upper end of said upper conveyor, vertical and horizontal cutter blades extending between said standards, a shaft extending between said standard's rotatable arms on said shaft for forcing potatoes against said blades; a chute extending from said upper end of said lower conveyor to a point adjacent the lower end of said first mentioned chute, second cutting blades adjacent the end of said last mentioned chute, a trough conveyor adjacent and below the juncture of said chutes and said trough conveyor for raising said potatoes from all the chutes to a position suitable for bagging, drive means for all said conveyors and a common source of power for all said drive means.

3. A machine for cutting and sizing seed potatoes comprising a main frame; an inclined hopper in said frame adjacent one end thereof, an endless screen conveyor extending longitudinally at an incline over said hopper for separating culls and trash from usable potatoes as the potatoes are moved upwardly thereon over said hopper, said conveyor having its upper end terminating beyond said hopper, an upper inclined screen conveyor in said hopper having its lower end positioned beneath the upper end of said first conveyor; said upper conveyor being of relatively wide mesh, transverse plates on said upper conveyor, a chute extending downwardly from the upper end of said inclined upper conveyor, a lower inclined conveyor beneath said upper conveyor for the reception of potatoes dropping through the mesh of said upper conveyor; a chute extending downwardly from the upper end of said lower conveyor to a point adjacent the lower end of said first mentioned chute, said lower conveyor having a smaller mesh than said upper conveyor, standards extending upwardly from the end of the frame adjacent the upper end of said upper conveyor, vertical and horizontal cutter blades extending between said standards, a shaft extending between said standard's rotatable arms on said shaft for forcing potatoes against said blades, resilient pairs of conveying guide strips adjacent said cutter blades, a deflector plate mounted over said first mentioned conveyor for guiding potatoes towards one side thereof, the blades adjacent said one side being arranged to cut potatoes into four pieces and the blades adjacent the other side being arranged to cut potatoes into three pieces only; a chute extending from said upper end of said lower conveyor to a point adjacent the lower end of said first mentioned chute, second cutting blades adjacent the end of said last mentioned chute, a trough conveyor adjacent and below the juncture of said chutes for raising said potatoes from all the chutes to a position suitable for bagging, drive means for all said conveyors and a common source of power for all said drive means.

4. A machine for cutting and sizing seed potatoes comprising a main frame; an inclined hopper in said frame adjacent one end thereof, an endless screen conveyor extending longitudinally at an incline over said hopper for separating culls and trash for usable potatoes as the potatoes are moved upwardly thereon over said hopper, said conveyor having its upper end terminating beyond said hopper, an upper inclined screen conveyor in said hopper having its lower end positioned beneath the upper end of said first conveyor; said upper conveyor being of relatively wide mesh, transverse plates on said upper conveyor, a chute extending downwardly from the upper end of said inclined upper conveyor, a lower inclined conveyor beneath said upper conveyor for the reception of potatoes dropping through the mesh of said upper conveyor; a chute extending downwardly from the upper end of said lower conveyor to a point adjacent the lower end of said first mentioned chute, said lower conveyor having a smaller mesh than said upper conveyor, standards extending upwardly from the end of the frame adjacent the upper end of said upper conveyor, vertical and horizontal cutter blades extending between said standards, a shaft extending between said standard's rotatable arms on said shaft for forcing potatoes against said blades; resilient pairs of conveying guide strips adjacent said cutter blades, a deflector plate mounted over said first mentioned conveyor for guiding potatoes towards one side thereof, the blades adjacent said one side being arranged to cut potatoes into four pieces and the blades adjacent the other side being arranged to cut potatoes into three pieces only; a chute extending from said upper end of said lower conveyor to a point adjacent the lower end of said first mentioned chute, second cutting blades adjacent the end of said last mentioned chute, a third chute below said lower conveyor for the reception of small potatoes passing therethrough, an inclined elevating conveyor adjacent the end of said third chute for elevating the small potatoes to a point adjacent the junction of said first and second chutes, a trough conveyor adjacent and below the juncture of said chutes, and said trough conveyor for raising said potatoes from all the chutes to a position suitable for bagging, drive means for all said conveyors and a common source of power for all said drive means.

References Cited in the file of this patent

UNITED STATES PATENTS

| Number | Name | Date |
|---|---|---|
| 874,321 | Gascard et al. | Dec. 17, 1907 |
| 1,432,152 | Bornholdt | Oct. 17, 1922 |
| 1,745,001 | Bates | Jan. 28, 1930 |
| 1,961,009 | Nachtigal | May 29, 1934 |